Oct. 7, 1958
D. N. WALKER
2,854,819
APPARATUS FOR IGNITING FUEL IN A FAST-MOVING HOT
GAS STREAM BY MEANS OF A SPONTANEOUSLY
IGNITABLE PILOT FUEL
Original Filed Jan. 23, 1946
2 Sheets-Sheet 1
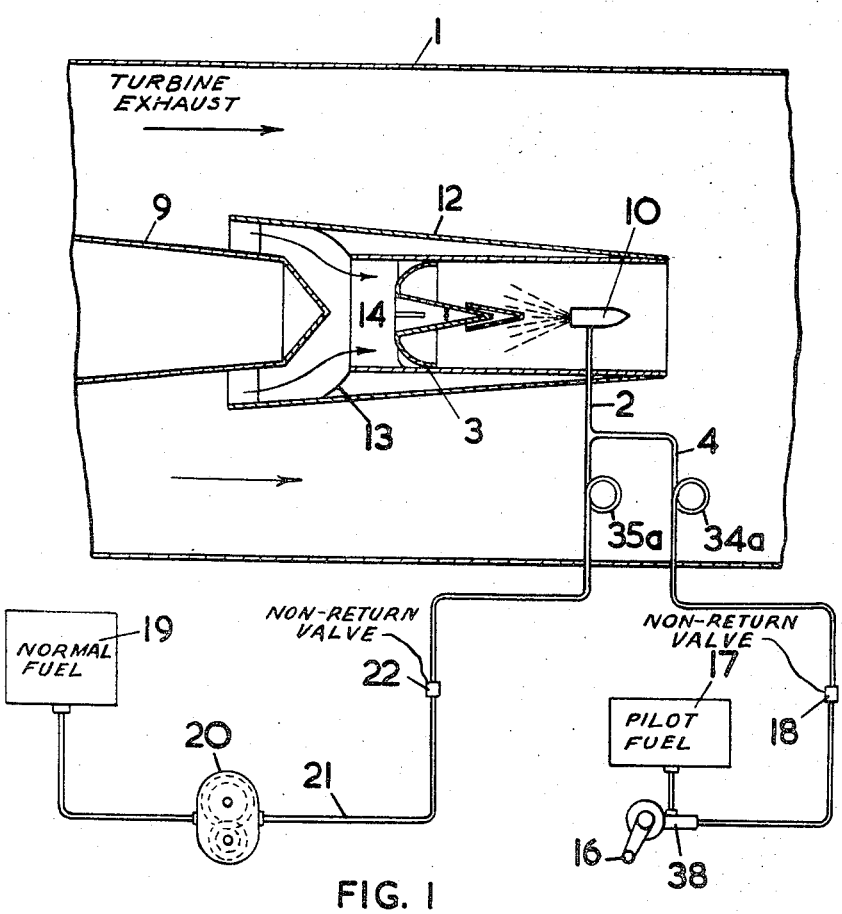
FIG. 1
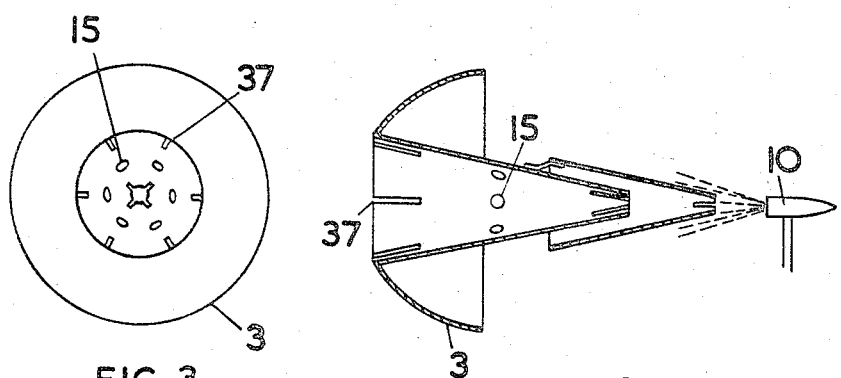
FIG. 3
FIG. 2
Inventor
Daniel Norman Walker
By
Stevens Davis, Miller & Mosher
his Attorneys

United States Patent Office 2,854,819
Patented Oct. 7, 1958

2,854,819

APPARATUS FOR IGNITING FUEL IN A FAST-MOVING HOT GAS STREAM BY MEANS OF A SPONTANEOUSLY IGNITABLE PILOT FUEL

Daniel Norman Walker, Little Hurlands, Dunsfold, England, assignor to Power Jets (Research and Development) Limited, London, England, a British company Original application January 23, 1946, Serial No. 642,920, now Patent No. 2,658,340, dated November 10, 1953. Divided and this application October 24, 1951, Serial No. 252,875

2 Claims. (Cl. 60—39.82)

This invention relates to combustion arrangements particularly for use in high velocity gas streams. As an example of an application of the invention which well illustrates one of its objects, it is applied to facilitate or promote the ignition of fuel in a reheat combustion system in the output of a gas turbine jet propulsion system. In such systems once ignition of the main fuel supply has been started it is found relatively easy to make it self-sustaining. To ignite the fuel initially however, has hitherto required the provision of a spark plug igniter or a glow plug igniter or the like. Since such an expedient may involve the provision of some wiring and insulation in inconvenient locations and exposed to high temperatures it is from some points of view undesirable.

To obviate this disadvantage, according to the invention it is proposed to provide means for introducing, in addition to the normal fuel supply, an initial flow of a reagent other than the normal fuel in the form of pilot fuel which will readily ignite under the conditions prevailing in the region where ignition is to be effected.

The pilot fuel can thus be supplied by relatively simple and easily applied means which are not especially vulnerable to high temperatures and which will not require any careful maintenance.

The pilot fuel may be introduced at a convenient point into the normal fuel supply pipe itself, or may be introduced by means of a pipe separate from the normal fuel supply pipe.

Means may also be provided to enable the main fuel supply to be directly operative in immediate sequence after the pilot fuel, which may be introduced by means of a pump acting under the influence of the normal fuel supply pressure.

The pilot fuel may further be injected into a region of turbulence produced by a baffle or like means, and may itself be a gas or a volatile liquid. A catalytic element may also be provided to ignite the pilot fuel.

The invention and further features thereof will be better understood by means of the following description made with reference to the accompanying drawings, in which:

Figure 1 is a diagrammatic view of one form of the invention;

Figure 2 is a side view on an enlarged scale of the baffle in this form of embodiment;

Figure 3 is an end view of said baffle;

Figure 5:
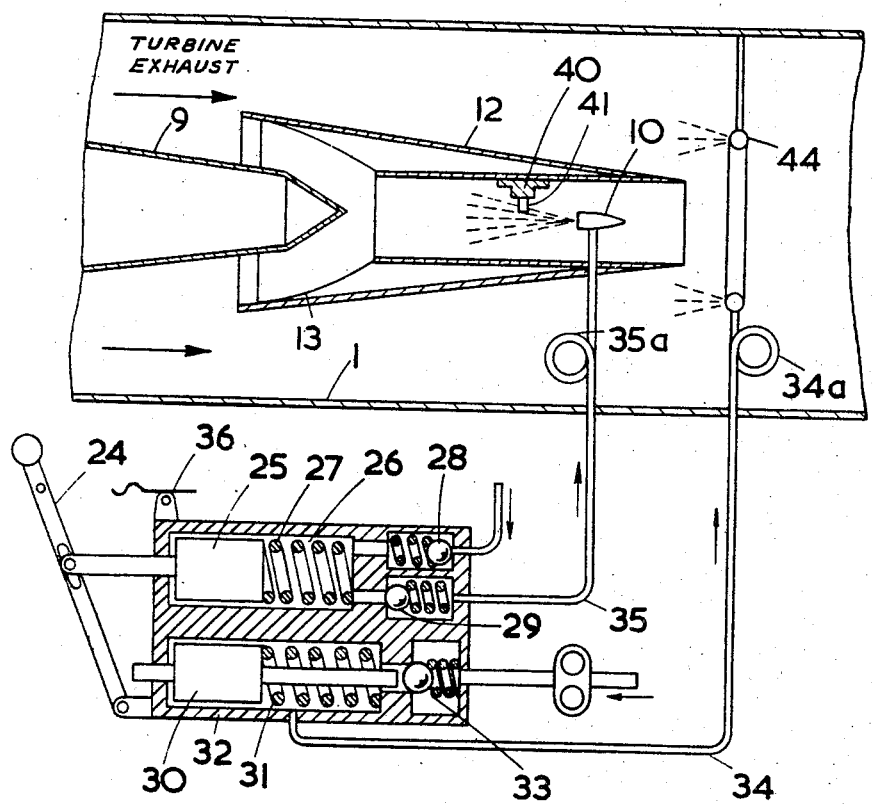
Figure 5 is a diagrammatic view of a second form of embodiment.

In Figure 1 the exhaust gases from a gas turbine flow at high velocity in the direction shown by the arrows through the duct 1 in which is provided on the downstream side of the turbine (not shown) the usual coaxial conical fairing or bullet-shaped member 9 and a reheat system comprising a fuel spray of reheat fuel supplied through a pipe 2 protruding through the wall of the duct 1, and injected into the exhaust stream by a jet nozzle 10. In the region of the fuel spray, means are provided for promoting aerodynamic turbulence, which in this case consists of a hollow conical baffle 3, which is exposed to the exhaust stream and will therefore be at or near the temperature of such stream at all relevant times. As shown in Figures 2 and 3 the wall of the baffle is provided with slots 37 and apertures 15. The nozzle 10 and the baffle 3 are disposed coaxially within a duct 14 having a flared entry 13 and mounted within a hollow frusto-conical member 12 which defines with the downstream end of conical fairing 9 an annular inlet passage to the duct 14.

Now if the ordinary fuel in use, for example that which is operating in the gas turbine engine, is sprayed in, it may be found to be unignitable, merely vaporizing, atomizing, or being carried away in the gas stream. At a convenient point in the supply pipe 2 of this reheat fuel there is therefore provided through a pipe connection 4 a charge of a reagent or pilot fuel which when it reaches the hot parts or gases will ignite at the prevalent temperature and conditions. Suitable pilot fuels would be a mixture comprising a lubricating oil containing 0.05 to 0.1% of stearic acid and 5% of amyl nitrate, the proportions being variable within reasonable limits, or colloidal magnesium, or tertiary butyl peroxide. This charge is introduced in such a way that it forms a slug of liquid in the fuel pipe 2 immediately followed by the flow of normal fuel e. g. kerosene which when it emerges from the nozzle 10 is consequently ignited and continues to burn as intended.

Figure 4:
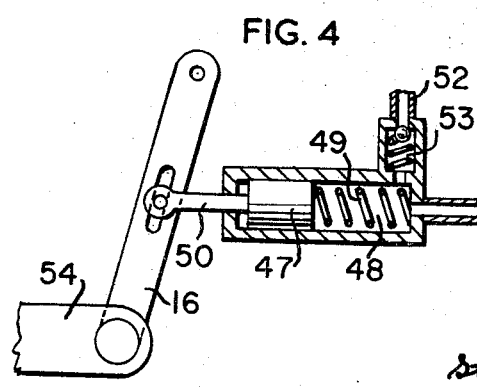
Figure 4 shows the construction of the pump 38 of Figure 1.

The normal fuel is supplied to the nozzle 10 from a tank 19 by means of a pump 20 through piping 21 which includes a main fuel cock 45 operated by a lever 46 and a non-return valve 22. The introduction of the pilot fuel is by a one stroke pump 38 operated by a lever 16. As shown in Figure 4, this pump comprises a piston 47 movable in a cylinder 48 against a return spring 49, the piston being integral with an operating rod 50 formed with a rack with which engages a pinion 51. The pinion 51 is fast with the lever 16 whereby the piston is operable to force a slug of pilot fuel from the cylinder 48 through a non-return valve 18 in the pipe 4 to the nozzle 10. Movement of the piston in the opposite direction under the action of the return spring 49 draws in a fresh charge of pilot fuel from the tank 17 through pipe 52 and non-return valve 53.

The lever 16 is pivotally connected to an operating rod 54 in which is formed an elongated slot 55 in which engages a pin 56 on the end of the lever 46 for the main fuel cock 45. The arrangement is such that the pin 56 is contacted by the end of the slot only at the end of the movement of the operating rod 54 to inject the slug of pilot fuel, i. e., to the right as shown in the drawing, so that turning on the normal fuel supply is inevitably preceded by charging the fuel pipe and nozzle with pilot fuel.

In Figure 5 is shown an alternative form of the invention in which the main fuel pipe 34 is separate from the pilot fuel pipe 35, fuel being injected by ring nozzle 44 and the pilot reagent by nozzle 10. The general system of fairing 9, member 12 and duct 14 with flared entry 13 is similar to Figure 1, but the baffle 3 is omitted, and a catalytic igniter 41 e. g. of platinum or any other suitable material is held in a support 40 to ignite the pilot fuel. The injection may be timed to precede the commencement of flow of the main fuel, by the arrangement shown in which lever 24 moves piston 25 in cylinder 26 against spring 27 to open nonreturn valve 29, and can also move rod 30 in cylinder 32 against the spring 31 bearing against the enlargement 30a on the rod 30 to open non-return valve 33. The pilot fuel enters the cylinder 26 through non-return valve 28 and forward movement of lever 24 introduces pilot fuel through pipe 35 until piston 25 is near the end of its stroke when rod 30 is contacted and moved to open valve 33 and permit pump 56 to introduce normal fuel through pipe 34. Lever 24 can be held in position or released by thumb latch 36.

The pipe 35 which crosses the main gas stream from the wall of the exhaust pipe to the nozzle 10 and the pipe 34 may be indirectly led for example by providing loops 34a, 35a in order to afford some degree of elasticity to accommodate thermal expansions or minor distortions. This application is a division of copending United States patent application Serial No. 642,920, filed January 23, 1946 (now Patent No. 2,658,340, issued November 10, 1953), in the names of Henry Cohen and Daniel N. Walker and later changed to the sole name of Henry Cohen.

I claim:

1. A combustion system for burning fuel in a high velocity hot gaseous stream comprising a duct conveying said stream, a burner nozzle, a fuel supply pipe leading thereto, a branch supply pipe leading into said first mentioned pipe, means for injecting a predetermined, finite charge of a reagent other than the normal fuel to be burnt through said branch pipe into the fuel supply pipe and then through said nozzle into the duct, said reagent being spontaneously ignitible in the ambient conditions created in the duct by the hot gas stream to form a pilot flame, and means for injecting normal fuel into the stream through said fuel supply pipe and nozzle immediately after the injection of said charge of reagent, whereby the fuel is ignited by the pilot flame.

2. In or for a gas turbine jet propulsion system having a jet pipe, a combustion system for burning fuel in said jet pipe comprising a burner nozzle in said jet pipe, a fuel supply pipe leading thereto, a branch supply pipe leading into said fuel supply pipe, means for injecting a predetermined, finite charge of a reagent other than the normal fuel to be burnt through said branch pipe into the fuel supply pipe and then through the nozzle into the jet pipe, said reagent being spontaneously ignitible in the ambient conditions created in the jet pipe by the exhaust gas stream to form a pilot flame, and means for injecting normal fuel into the jet pipe through said fuel supply pipe and nozzle immediately after the injection of said charge of reagent, whereby the fuel is ignited by the pilot flame.

References Cited in the file of this patent

UNITED STATES PATENTS

| | | |
|---|---|---|
| 1,220,103 | Hall | Mar. 20, 1917 |
| 1,273,466 | Doble | July 23, 1918 |
| 1,625,630 | Scott | Apr. 19, 1927 |
| 1,670,819 | Morris et al. | May 22, 1928 |
| 1,849,051 | Helmore | Mar. 8, 1932 |
| 2,093,008 | Egerton | Sept. 14, 1937 |
| 2,158,050 | Bereslavsky | May 16, 1939 |
| 2,356,786 | Harman et al. | Aug. 29, 1944 |
| 2,368,179 | Turpin | Jan. 30, 1945 |
| 2,385,833 | Nahigyan | Oct. 2, 1945 |
| 2,404,335 | Whittle | July 16, 1946 |
| 2,407,973 | Beckstrom | Sept. 24, 1946 |
| 2,410,881 | Hunter | Nov. 12, 1946 |
| 2,474,685 | McCollum | June 28, 1949 |
| 2,500,334 | Zucrow | Mar. 14, 1950 |
| 2,520,388 | Earl | Aug. 29, 1950 |
| 2,575,682 | Price | Nov. 20, 1951 |

FOREIGN PATENTS

| | | |
|---|---|---|
| 316,055 | Great Britain | July 25, 1929 |
| 386,320 | France | Apr. 9, 1908 |